No. 677,132. Patented June 25, 1901.
J. J. HEYS.
CLUTCH AND BRAKE MECHANISM.
(Application filed May 27, 1898.)
(No Model.)
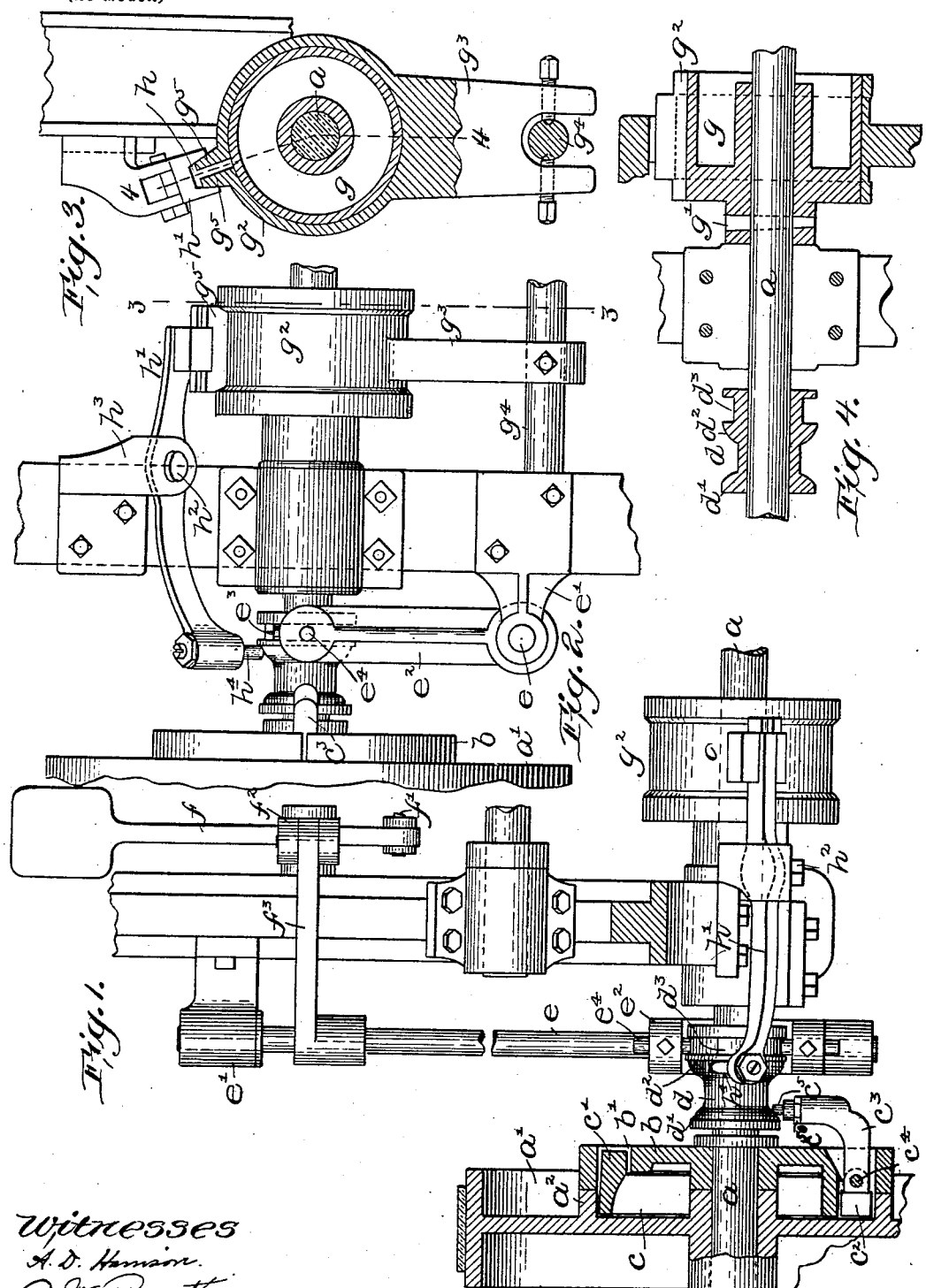
Witnesses
A. D. Hanson
O. W. Pezzetti
Inventor
John J. Heys
by Wright, Brown & Quinby Attys.
THE NORRIS PETERS CO., PHOTO-LITHO., WASHINGTON, D. C.

UNITED STATES PATENT OFFICE.

JOHN J. HEYS, OF LYNN, MASSACHUSETTS, ASSIGNOR OF ONE-HALF TO MAURICE V. BRESNAHAN, OF SAME PLACE.

CLUTCH AND BRAKE MECHANISM.

SPECIFICATION forming part of Letters Patent No. 677,132, dated June 25, 1901.

Application filed May 27, 1898. Serial No. 681,875. (No model.)

*To all whom it may concern:*

Be it known that I, JOHN J. HEYS, of Lynn, in the county of Essex and State of Massachusetts, have invented certain new and useful Improvements in Clutch and Brake Mechanism, of which the following is a specification.

This invention has relation to clutch and brake mechanisms, such as those employed upon various kinds of shoe machinery wherein it is desirable or necessary to start and stop a shaft at intervals to accomplish certain movements of the machinery; and it has for its object to provide certain improvements in the same, whereby the shaft may be started and stopped with greater ease and accuracy than heretofore and the mechanism simplified in construction.

The invention to these ends consists of certain improved features of construction and arrangement of parts, as fully illustrated upon the drawings and now to be described in detail and finally pointed out in the claims.

Reference is to be had to the accompanying drawings, and to the letters marked thereon, forming a part of this specification, the same letters designating the same parts or features, as the case may be, wherever they occur.

Of the drawings, Figure 1 represents in plan view, partially in section, a clutch and brake mechanism embodying my invention. Fig. 2 represents a rear elevation of the same. Fig. 3 represents a section on the line 3 3 of Fig. 2. Fig. 4 represents a section on the line 4 4 of Fig. 3.

In the embodiment of my invention which I have elected to illustrate the shaft which it is desired to start and stop is indicated at $a$. This shaft is suitably mounted in bearings on the frame of the machine, and loosely placed thereon is a belt-pulley $a'$, by means of which motion is transmitted thereto. The belt-wheel is provided with an inwardly-projecting flange $a^2$, confronting which is a disk $b$, rigidly secured to the shaft and having an aperture $b'$ to receive the lug $c'$ of a split ring $c$, which ring is placed within the flange $a^2$ of the belt-wheel $a'$. Between the ends of the split ring is inserted the wedge-shaped end $c^2$ of a bent lever $c^3$, passing through an aperture in the disk $b$ and pivoted to the said disk at $c^4$. By throwing the pin $c^5$ of the lever, which is adjustable, outward, the wedge-shaped end $c^2$ thereof is forced between the ends of the split ring in such manner as to expand the ring and clamp it firmly against the flange $a^2$ of the wheel $a'$, so as to connect the disk $b$, and therefore the shaft $a$, to the belt-wheel $a'$.

The pin $c^5$ may be made adjustable in any suitable way, as by threading it and internally threading the end of the lever $c^3$, a locknut for holding said pin in its adjusted position being indicated at $c^{50}$.

For the purpose of throwing the end of the lever $c^3$ downward a sleeve $d$ is placed upon the shaft $a$ and is provided at one end with a beveled flange $d'$, which when the sleeve is forced away from the disk $b$ engages the end $c^5$ of the lever and thrusts the wedge-shaped end $c^2$ between the ends of the split ring. The other end of the sleeve is provided with a beveled flange $d^2$ and with a groove $d^3$. Arranged below the sleeve is a rock-shaft $e$, mounted in suitable bearings $e'$ $e'$, projecting outward from the frame of the machine, and extending upward from one end of the shaft $e$ is an arm $e^2$, having its forked ends projecting on both sides of the sleeve $d$. Shoes $e^3$, mounted upon the ends of pins $e^4$, adjustably secured in the forks of the arms $e^2$, project into the groove $d^3$ of the sleeve $d$, so that when the shaft $e$ is rocked the sleeve is moved longitudinally of the shaft $a$.

For the purpose of rocking the shaft $e$ a foot-lever $f$ is fulcrumed, as at $f'$, and is provided with an upwardly-projecting rod $f^2$, pivoted to an arm $f^3$, projecting out from the shaft $e$. By depressing the lever $f$ the shaft $e$ is rocked sufficiently to throw the sleeve $d$ away from the disk, and thereby cause the clutching of the shaft $a$ to the wheel $a'$.

In addition to the clutch I provide a brake mechanism which is arranged to be operated upon the unclutching of the shaft and wheel. A drum or hub $g$ is secured upon the shaft $a$ by a pin $g'$, the drum being encircled by a stationary split ring $g^2$, formed with a projecting arm $g^3$, secured to a tie-rod or cross-bar $g^4$. The ends $g^5$ $g^5$ of the split ring $g^2$ are oppositely beveled and extend into a partially V-shaped aperture $h$, formed in the end of a lever $h'$, pivoted by a pin $h^2$ to a stationary support $h^3$. The other end of the lever $h'$ is provided with an adjustable pin $h^4$, which bears upon the sleeve $d$.

The parts are so arranged that when the sleeve is shifted to clutch the shaft and the wheel $a'$ the lever $h'$ is in its inoperative position, with the pin $h^4$ resting upon the body of the sleeve. Immediately upon the sleeve being shifted in the other direction the pin $c^5$ of the lever $c^3$ slides down the bevel-flange $d'$, so as to allow the split ring $c^2$ to contract and release the wheel $a'$, and the pin $h^4$ of the lever $h'$ is thrust upward by the bevel-flange $d^2$ of the sleeve, so as to thrust the other end of the lever $h'$ down, whereupon the converging walls of the recess $h$ engage the ends of the split ring $g^2$ and bind the split ring tightly upon the drum or hub $g$, so as to stop the rotation thereof. The foot-lever $d'$ may be held upward by a spring in the ordinary way.

Thus it will be seen that I have provided a superior mechanism for effecting the starting and stopping of the shaft and that its efficiency is greater than any of those heretofore used.

Having thus explained the nature of the invention and described a way of constructing and using the same, though without attempting to set forth all of the forms in which it may be made or all of the modes of its use, I declare that what I claim is—

1. The combination of a rotary shaft, a pulley loose on said shaft, a clutch between the shaft and the pulley, a cylindrical brake-wheel fast on said shaft, a stationary split brake-band encircling said brake-wheel, a centrally-pivoted lever $h'$ having means on one end for contracting said band around said wheel, and a sliding sleeve for operating the clutch and the lever alternately.

2. The combination of a rotary shaft, a pulley loose on the shaft, an expansible ring carried by the shaft and adapted to frictionally engage the pulley, a clutch-lever for expanding the ring, a brake-wheel fast on the shaft, a stationary contractile brake-band encircling the said wheel, a centrally-pivoted brake-lever having means at one end for contracting said band, and a sliding sleeve having two tapering portions for actuating said levers alternately.

In testimony whereof I have affixed my signature in presence of two witnesses.

JOHN J. HEYS.

Witnesses:
A. D. HARRISON,
P. W. PEZZETTI.